(12) United States Patent  
Stahler et al.

(10) Patent No.: US 9,214,096 B2
(45) Date of Patent: Dec. 15, 2015

(54) SYSTEM AND METHOD FOR SEIZURE SIMULATION IN HEALTH TRAINING MANNEQUIN

(76) Inventors: Gregory J. Stahler, San Jose, CA (US); Jeffery B. Alvarez, San Mateo, CA (US)

( * ) Notice: Subject to any disclaimer, the term of this patent is extended or adjusted under 35 U.S.C. 154(b) by 683 days.

(21) Appl. No.: 12/580,201

(22) Filed: Oct. 15, 2009

(65) Prior Publication Data

US 2011/0091854 A1    Apr. 21, 2011

(51) Int. Cl.
*G09B 23/28* (2006.01)
*G09B 23/32* (2006.01)
*G09B 23/30* (2006.01)
*G09B 23/34* (2006.01)

(52) U.S. Cl.
CPC .............. *G09B 23/32* (2013.01); *G09B 23/28* (2013.01); *G09B 23/281* (2013.01); *G09B 23/30* (2013.01); *G09B 23/34* (2013.01)

(58) Field of Classification Search
CPC ........ G09B 23/28; G09B 23/30; G09B 23/32; G09B 23/34; G09B 23/281
USPC .......................................... 434/262, 267, 268
See application file for complete search history.

(56) References Cited

U.S. PATENT DOCUMENTS

| | | | | |
|---|---|---|---|---|
| 6,792,819 | B2 * | 9/2004 | Gladney et al. | 73/865.3 |
| 7,857,626 | B2 * | 12/2010 | Toly | 434/267 |
| 7,976,312 | B2 * | 7/2011 | Eggert et al. | 434/267 |
| 7,976,313 | B2 * | 7/2011 | Eggert et al. | 434/268 |
| 7,997,904 | B2 * | 8/2011 | Deering | 434/262 |
| 8,016,598 | B2 * | 9/2011 | Eggert et al. | 434/267 |
| 8,323,032 | B2 * | 12/2012 | Deering | 434/262 |
| 8,382,485 | B2 * | 2/2013 | Bardsley et al. | 434/262 |
| 2004/0126746 | A1 * | 7/2004 | Toly | 434/262 |
| 2004/0162587 | A1 | 8/2004 | Hampton et al. | |
| 2008/0131855 | A1 * | 6/2008 | Eggert et al. | 434/266 |
| 2008/0138778 | A1 * | 6/2008 | Eggert et al. | 434/266 |
| 2008/0138779 | A1 * | 6/2008 | Eggert et al. | 434/266 |
| 2008/0138780 | A1 * | 6/2008 | Eggert et al. | 434/266 |
| 2008/0227073 | A1 * | 9/2008 | Bardsley et al. | 434/267 |
| 2009/0068627 | A1 * | 3/2009 | Toly | 434/267 |
| 2010/0227303 | A1 * | 9/2010 | Deering | 434/273 |
| 2011/0189641 | A1 * | 8/2011 | Deering | 434/262 |

FOREIGN PATENT DOCUMENTS

WO    WO 2009039210 A2 *    3/2009    ............. G09B 23/38
WO    WO 2009039210 A9 *    2/2010    ............. G09B 23/28

OTHER PUBLICATIONS

Daniels K, Parness AJ. Development and use of mechanical devices for simulation of seizure and hemorrhage in obstetrical team training. Abstract Simul Healthc. 2008 Spring;3(1):42-6. doi: 10.1097/01. SIH.0000290632.83361.4b.PMID:19088641[PubMed—indexed for MEDLINE] <URL:http://ovidsp.tx.ovid.com>.*

Daniels K, Parness AJ. Development and use of mechanical devices for simulation of seizure and hemorrhage in obstetrical team training. Full Text Simul Healthc. 2008 Spring;3(1):42-6. doi: 10.1097/01. SIH.0000290632.83361.4b.PMID:19088641    [PubMed—indexed for MEDLINE] URL:http://ovidsp.tx.ovid.com.*

* cited by examiner

*Primary Examiner* — Nikolai A Gishnock
(74) *Attorney, Agent, or Firm* — David C. Lundmark

(57) ABSTRACT

One embodiment is directed to a seizure simulation system, comprising a motion inducer comprising a housing, an interface structure, and an actuator; wherein the interface structure is coupled to the actuator, movable relative to the housing, and configured to interface with a portion of a health training mannequin, from a position external to the health training mannequin, to induce motion in at least one portion of the health training mannequin.

20 Claims, 6 Drawing Sheets

SYSTEM AND METHOD FOR SEIZURE SIMULATION IN HEALTH TRAINING MANNEQUIN

FIELD OF THE INVENTION

The invention relates to the simulation of motions or movement in a health training mannequin for teaching purposes, and more particularly to a seizure simulation apparatus configured to be housed separately from but interfaced with a health training mannequin to induce oscillatory motion symptomatic of a neurological seizure or similar disorder in the mannequin.

BACKGROUND

Health training mannequins are utilized in the United States and other countries to assist in the training of medical procedures such as cardiopulmonary resuscitation, first aid, and various nursing procedures. Various configurations are available from suppliers such as Medical Supplies and Equipment Co., of Houston, Tex. Some commercially available health training mannequin models, such as that (2) depicted in FIG. 1, comprise a fairly complete simulated patient body having legs (8), a torso (6), arms (10), and a head (12). They often are accompanied by a bed pad (4) generally comprising a compliant material, such as polyurethane foam. Other commercially available models may simply comprise a torso and head, or other minimalist variations, depending upon the desired training exercise, financial budget, etc. Some models are available with on-board (i.e., housed within the mannequin) subsystems configured to simulate bleeding, sounds, or movements. For example, some health training mannequins are available with on-board vibratory motion devices which may be configured to create small oscillatory motions within the mannequin portions in which they are housed, and to a lesser extent to other mannequin portions attached to the portion housing the vibratory motion device. These systems are generally very expensive, and not optimally configured for simulating a human scale seizure, such as a clonic tonic, grand mal, or eclampsia-related seizure, which may accompany critical real-world medical conditions. To assist with training related to such conditions, there is a need for a simulation configuration broadly applicable to many types of health training mannequins, which is capable of inducing movement in such mannequins to more accurately simulate body movements related to such seizure conditions.

SUMMARY

One embodiment is directed to a seizure simulation system comprising a motion inducer comprising a housing, an interface structure, and an actuator, wherein the interface structure is coupled to the actuator, movable relative to the housing, and configured to interface with a portion of a health training mannequin to induce motion in at least one portion of the health training mannequin. In one embodiment, the system may further comprise a remote unit operably coupled to the system and operable by a user to control the actuator. In another embodiment, the system may further comprise a remote control coupled to the system and operable by a user to change characteristics of the operation of the actuator. In one embodiment the housing may be coupled to a health training mannequin pad. In one embodiment, the pad may comprise a resting surface for a health training mannequin, the housing is substantially embedded within the pad below the resting surface, and the interface structure may be positioned to oscillatorily move in and out relative to the resting surface with an oscillatory throw dimension configured to induce movement in the at least one portion of the health training mannequin. In one embodiment the oscillatory throw dimension may be about 2.5 centimeters (one inch). In another embodiment the throw dimension may be adjustable from about 0 centimeters (zero inches) of throw to about 5 centimeters (two inches) of throw. In one embodiment the interface structure may comprise a piston. The piston may comprise a substantially cylindrical interface surface configured to interface with the portion of a health training mannequin. In one embodiment the actuator may comprise an electromechanical solenoid. In another embodiment the actuator may comprise an electric motor. In one embodiment the interface structure may be configured to transiently interface with the back of the health training mannequin. In one embodiment that oscillatory motion inducer may be configured to provide loads to the health training mannequin sufficient to cause the mannequin to substantially follow motion of the interface structure relative to the housing. In one embodiment the characteristics of the operation of the electromechanical actuator may be selected from the group consisting of an oscillatory action timing variable, an oscillatory inaction timing variable, an oscillatory throw dimension variable, and an oscillatory action load variable.

Another embodiment is directed to a method for simulating a seizure in a health training mannequin, comprising interfacing a portion of a health training mannequin with an interface structure, the interface structure being coupled to an actuator and movable relative to a housing coupled to the actuator, the housing not being housed within a portion of the health training mannequin. In one embodiment the method may further comprise remotely controlling the actuator using a remote control console operably coupled to the actuator. In another embodiment the method may further comprise adjusting characteristics of operation of the actuator selected from the group consisting of an oscillatory action timing variable, an oscillatory inaction timing variable, an oscillatory throw dimension variable, and an oscillatory action load variable. In one embodiment the interface structure may be interfaced with a dorsal, or back, portion of the health training mannequin. In one embodiment, oscillatory motion of at least a portion of the health training mannequin may be produced as a result of interfacing with the mannequin's back. In one embodiment, such oscillatory motion of the portion of the health training mannequin may substantially follow oscillatory motion of the interface structure. In one embodiment interfacing may comprise oscillatorily moving the interface structure relative to the portion of a health training mannequin.

DETAILED DESCRIPTION

Figure 1:
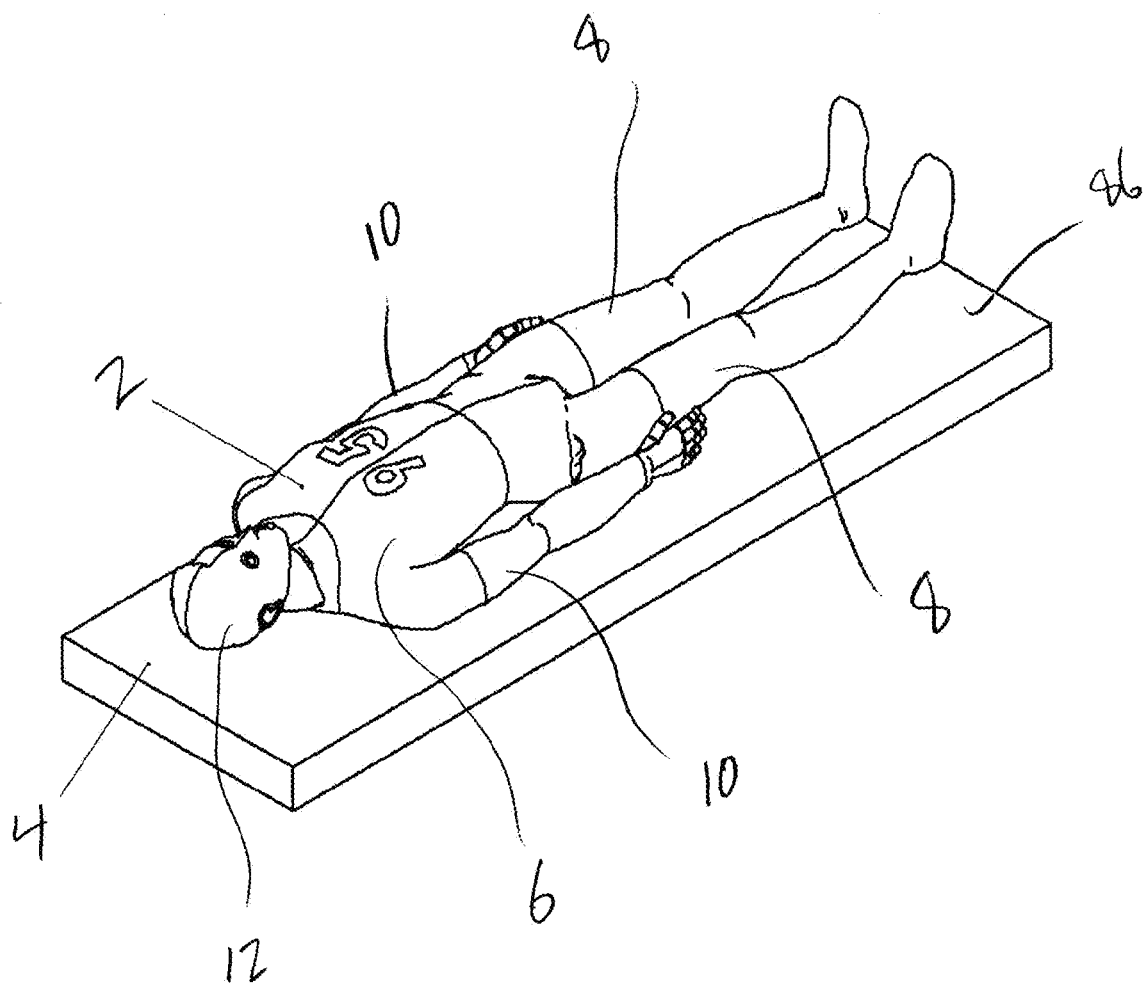
FIG. 1 illustrates a conventional health training mannequin positioned upon a bed pad.
Figure 2:
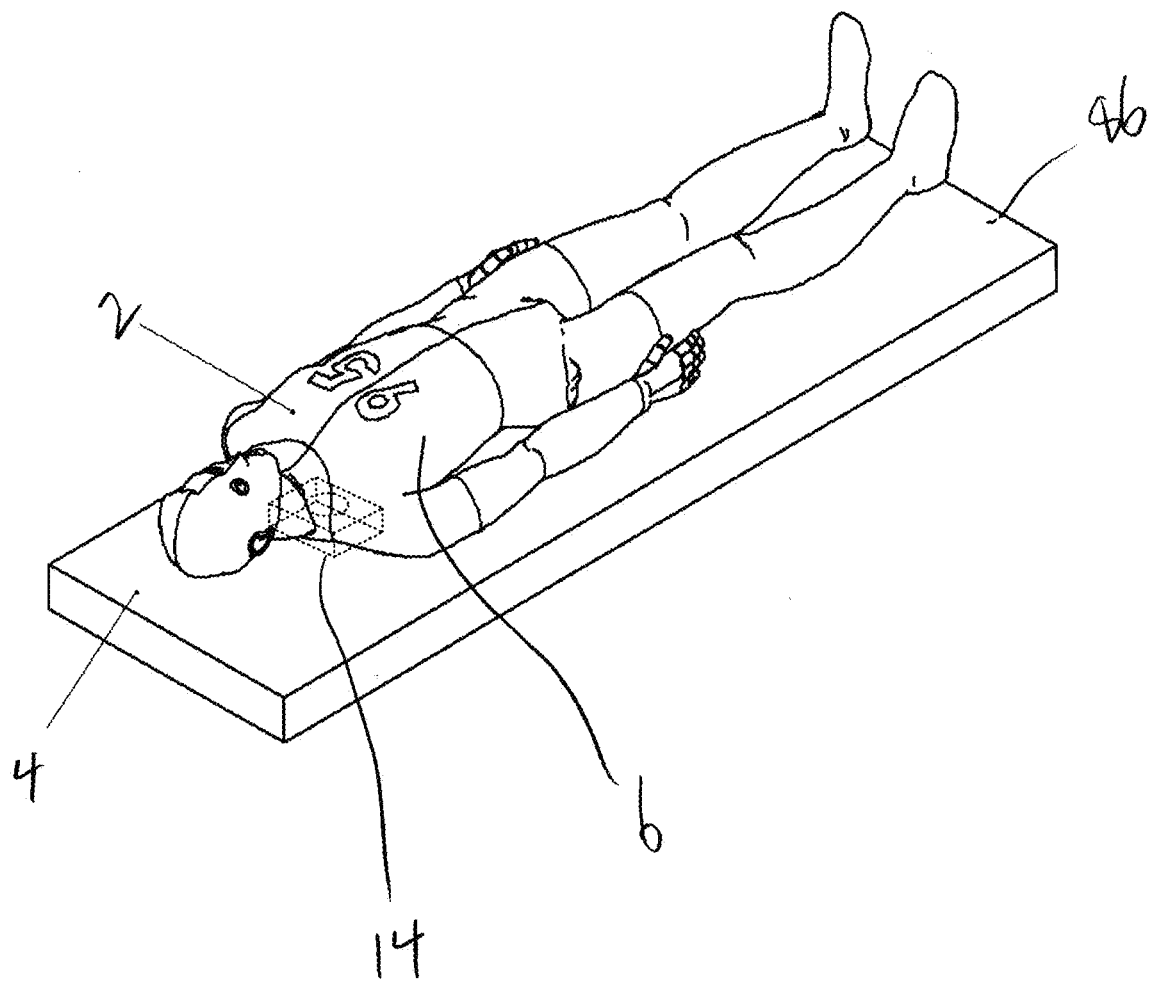
FIG. 2 illustrates a conventional health training mannequin positioned upon a bed pad with a motion inducement apparatus interposed between a portion of the bed pad and the mannequin.

Referring to FIG. 2, a health training mannequin (2) similar to that depicted in FIG. 1 is shown positioned against a bed pad (4). Below the back, or dorsal aspect, of the mannequin, a motion inducer (14—illustrated in dashed lines) is positioned within a portion of the bed pad (4) that has been formed to accommodate the motion inducer (14), and allow for a portion of the motion inducer assembly to protrude past the top, or "resting", surface (86) of the bed pad (4) to contact the back, or other portion, of the mannequin (2) to induce oscillatory motion of the mannequin or portions thereof.

Figure 3:
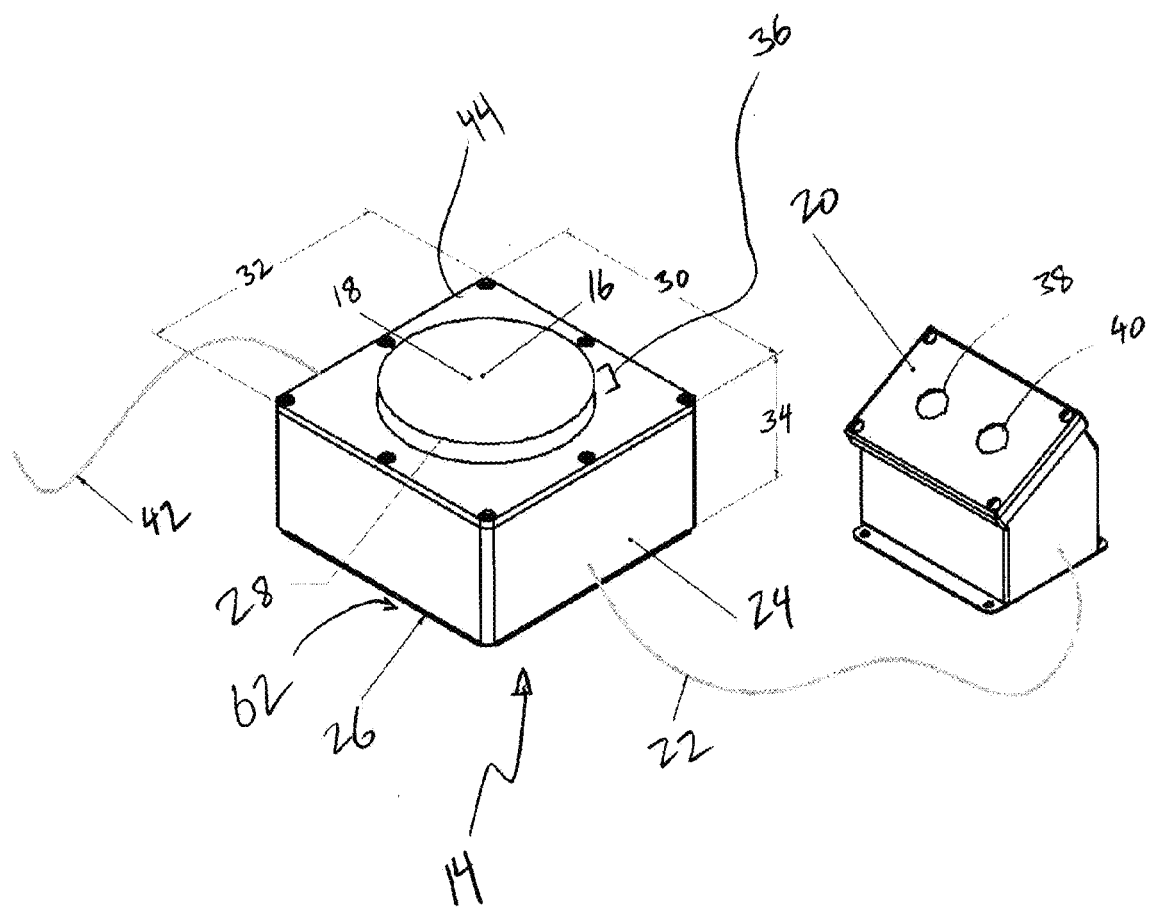
FIG. 3 illustrates aspects of one embodiment of an inventive seizure simulation system, including a motion inducer comprising a housing and an interface structure, and a remote controller.
Figure 4A:
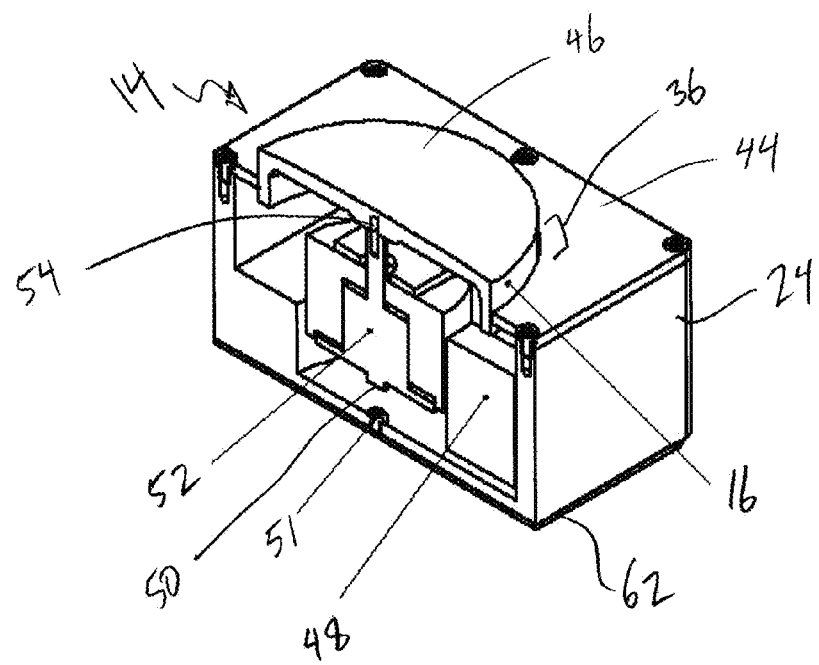
FIG. 4A illustrates a cross sectional orthogonal view of one embodiment of a motion inducer.
Figure 4B:
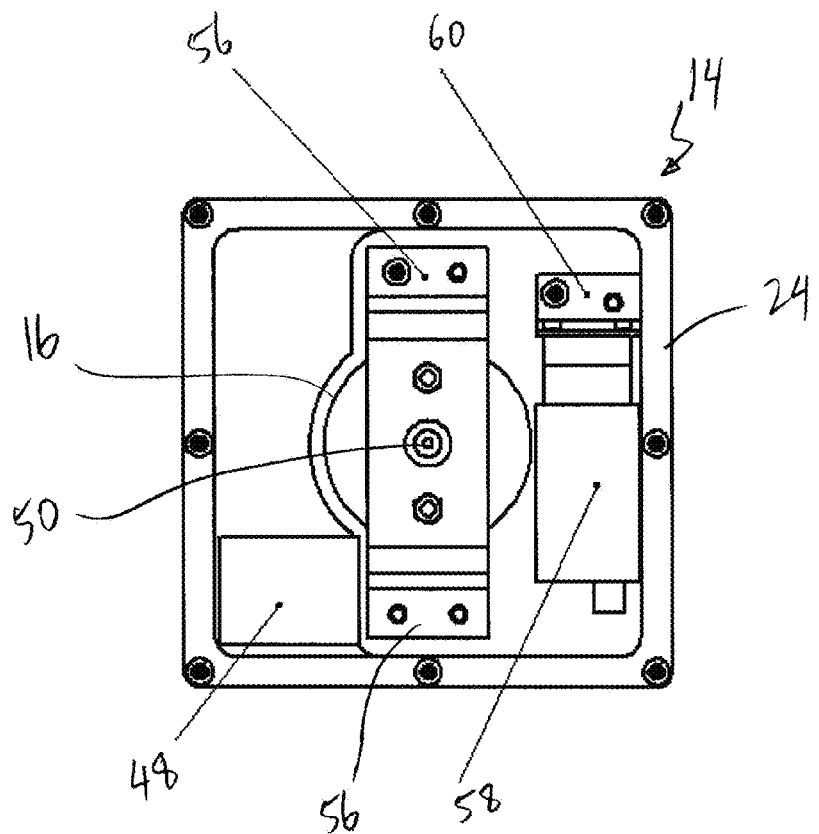
FIG. 4B illustrates a partial bottom view of one embodiment of a motion inducer.
Figure 6:
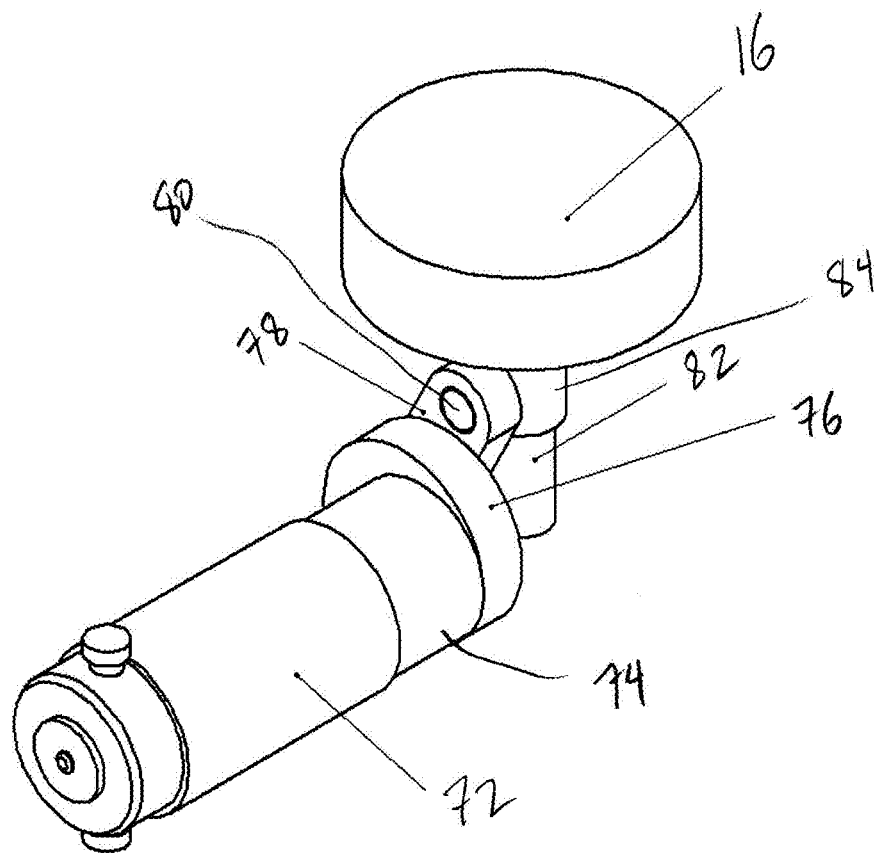
FIG. 6 illustrates a partial orthogonal view of one embodiment of a motion inducer assembly comprising a motor, cam, and piston type configuration for creating oscillatory motion.

Referring to FIG. 3, a motion inducer (14) is depicted along with a remote controller interface (20) which may be positioned away from the mannequin, at the edge of the bed pad (4), etc., depending upon the length of the control cable (22) coupling the remote controller interface (20) to the motion inducer (14). The depicted motion inducer (14) comprises a housing (24), an interface structure (16), and an actuator (now shown in FIG. 3; embodiments are shown in FIGS. 4A, 4B, 6). A power cable (42) couples the actuator and related electronics to an external power supply. In the illustrate embodiment, the housing (24) comprises a rectangular prism shape configured to fit within a recess formed into an associated bed pad (4). Preferably such bed pad recess snugly accommodates the housing to maximize transfer of motions to a mannequin. Further, the recess preferably maintains the top surface (44) of the housing at a position approximately coplanar with the top surface (86) plane of the bed pad (4). A compliant, high friction material layer (26), such as one comprising rubber or polyurethane, may be coupled to the bottom surface (62) of the housing (24) to maintain relative positioning of the housing and bed pad. As shown in FIG. 3, the interface structure (16) is configured to oscillatorily move relative to the housing (24) with a throw dimension (36) designed to contact the mannequin and move it along with the oscillatory motion of the interface structure (16). Preferably the interface structure (16) comprises a piston or piston-like structure having a substantially cylindrical interfacing shape, as depicted in FIG. 3. The top surface of the interface structure (16) may be coupled to a compliant layer (18) of material, such as polyurethane or neoprene, configured to mitigate impulse loads which may be placed upon the associated mannequin. In one embodiment, the length (30) of the housing may be about 20.3 centimeters (eight inches), the width (32) about 20.3 centimeters (eight inches), and the depth (34) about 10.2 centimeters (four inches); in such embodiment, the top of the interface structure may have a diameter (28) of about 14.6 centimeters (five and three quarters inches), and the interface structure throw (36) may be about 2.5 centimeters (one inch), and may be adjustable from about 0 centimeters (zero inches) to about 5 centimeters (two inches). Preferably the top surface (44) of the housing (24) is positioned substantially coplanar with the plane of the bed pad (4) resting surface (86), with the interface structure configured to "throw", insert, or move toward the mannequin from there.

Referring to FIG. 3, the remote controller interface (20) may comprise one or more buttons, knobs, switches, or other interfaces (38, 40), which may be configured to control or adjust characteristics of the oscillatory motion, including but not limited to oscillatory action timing variables (i.e., how long a cycle of oscillatory motion lasts), oscillatory inaction timing variables (i.e., how long a cycle of inaction between cycles of oscillatory action lasts), oscillatory throw insertion/retraction variables (i.e., how long an interface structure, such as the piston-like variation (16) depicted in FIG. 3, travels in and out toward and away from the mannequin), and oscillatory action load variables (i.e., how much load is to be imparted to objects contacted by the interface structure). In one embodiment, the interface structure (16) is repositioned level to the top surface (44) of the housing (24), and/or level to the resting surface (86) of the bed pad (4), and is accelerated forward toward the mannequin at a frequency of approximately two to three Hertz.

Referring to FIG. 4A, a partial cross sectional view of one embodiment of a motion inducer (14) assembly is depicted. In this embodiment, the actuator comprises a solenoid (52), such as that available from LedEx, Inc. of Vandalia, Ohio, as Model Number 0191016-025. The solenoid is coupled to the interface structure (16) using a coupling element (54) such as a screw, pin, or similar mechanical fastener to translate oscillatory motion of the solenoid into oscillatory motion of the interface structure (16), and thereby impart loads, acceleration, and movement to the portion of the mannequin which may be interfaced with the top surface (46) of the interface structure (16), which, in this embodiment comprises a piston or pistonlike structure. The oscillatory motion throw dimension (36) may be adjusted using an adjustment screw port (51) through the housing (24) which provides access to a stroke adjustment screw (50) comprising the solenoid. The interface between the top surface (44) of the housing (24) and the interface structure (16) is configured to have minimized pinch points, to avoid accidental pinching of fingers or portions of the mannequin between the interface structure (16) and housing (24) as relative motion of these two is produced by the actuator. An electric relay (48), such as the solid state relay available from Crydom, Inc. of San Diego, Calif., as part number D1D07 is utilized to produce controlled and relatively high frequency oscillation of the solenoid. Preferably it is interposed between the timing relay and the solenoid.

Referring to FIG. 4B, a partial bottom view (absent the bottom panel of the housing 24) is depicted, showing the positioning of the relay (48) as well as a timing relay (58), which preferably is interposed between the solid state relay (48) and the remote control console (not shown in FIG. 4A; element 20 in FIG. 3) to allow for adjustment of oscillatory motion variables associated with motion of the solenoid (52), as described above. A timing relay such as that available as part number 7630k81 from McMaster Carr, Inc., of Santa Fe Springs, Calif., is suitable. The timing relay (58) is coupled to the housing (24) with a mounting bracket (60). Another mounting bracket (56) couples the solenoid assembly to the housing (24).

Figure 5:
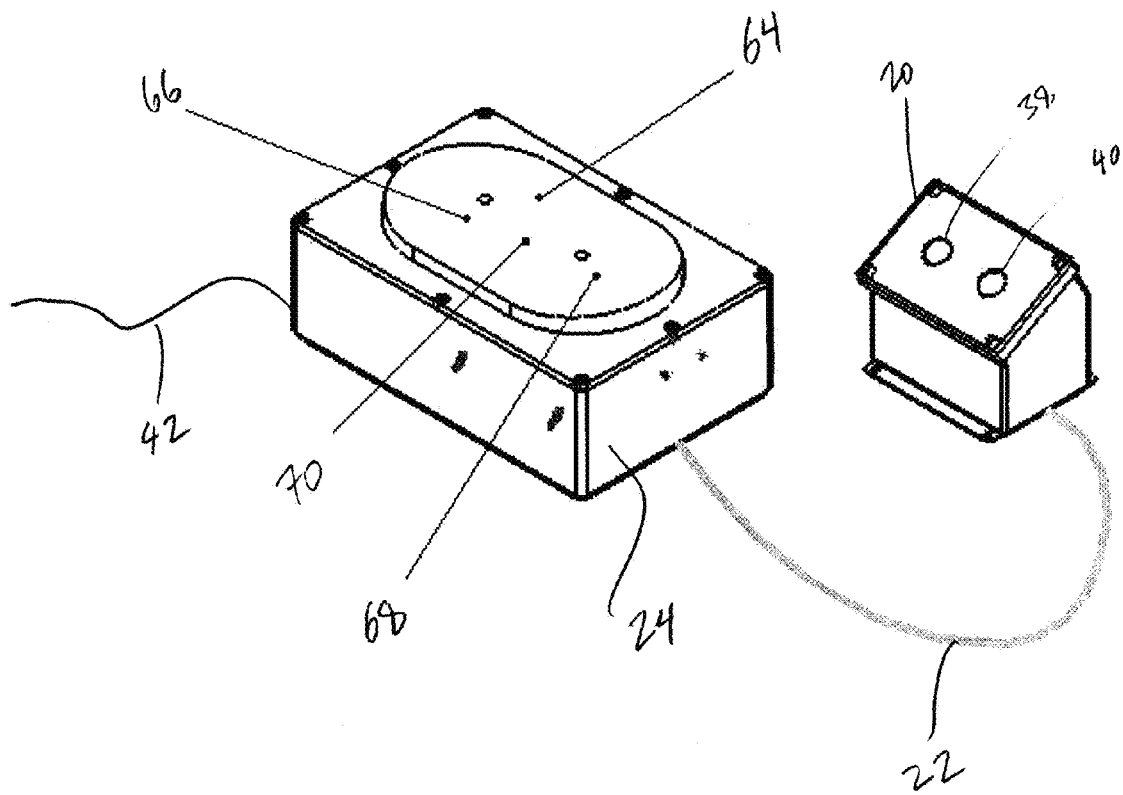
FIG. 5 illustrates aspects of one embodiment of an inventive seizure simulation system, including a motion inducer comprising a housing and an interface structure, and a remote controller.

Referring to FIG. 5, an embodiment featuring a wider interface structure (64) is depicted. This embodiment preferably is actuated by two actuators acting in parallel, underneath locations approximately highlighted as elements 66 and 68 in FIG. 5. In one embodiment, the interface structure (64) may have a somewhat convex (70), or "domelike", top surface to optimize contact with portions of the mannequin. Indeed, in some embodiments, the interface structures featured in FIGS. 2-4B may have similar convex top surfaces.

Referring to FIG. 6, a partial motion inducer assembly is depicted showing a piston-like interface structure (16) coupled to an electric motor (72) by a gearbox (74) and assembly comprising a rotating cam (76), cam link member (78), pin (80), shaft sleeve member (84), and linear bushing (82). In other embodiments, hydraulic and/or pneumatic actuators may be utilized with similar motion actuation assemblies to drive an interface structure through oscillatory motion.

While multiple embodiments and variations of the many aspects of the invention have been disclosed and described herein, such disclosure is provided for purposes of illustration only. For example, wherein methods and steps described above indicate certain events occurring in certain order, those of ordinary skill in the art having the benefit of this disclosure would recognize that the ordering of certain steps may be modified and that such modifications are in accordance with the variations of this invention. Additionally, certain of the steps may be performed concurrently in a parallel process when possible, as well as performed sequentially. Further, other materials selections are within the scope of this invention. Accordingly, embodiments are intended to exemplify alternatives, modifications, and equivalents that may fall within the scope of the claims.

The invention claimed is:

1. A seizure simulation system, comprising:
    a motion inducer comprising a housing, an interface structure, and an actuator;
    wherein the interface structure is coupled to the actuator, movable relative to the housing, and configured to removably and mechanically interface with a portion of a health training mannequin, from a position external to the health training mannequin, to induce seizure simulation motion in at least one portion of the health training mannequin; and
    wherein the housing is coupled to a health training mannequin pad comprising a resting surface for the health training mannequin such that the housing is substantially embedded within the pad below the resting surface, and the interface structure is positioned to oscillatorily move in and out relative to the resting surface with an oscillatory throw dimension configured to induce movement in the at least one portion of the health training mannequin, the oscillatory throw dimension being about 2.5 centimeters (one inch).

2. The system of claim 1, further comprising a remote unit operably coupled to the system and operable by a user to control the actuator.

3. The system of claim 1, further comprising a remote control coupled to the system and operable by a user to change characteristics of the operation of the actuator.

4. The system of claim 1, wherein the interface structure comprises a piston.

5. The system of claim 4, wherein the piston comprises a substantially cylindrical interface surface configured to interface with the portion of a health training mannequin.

6. The system of claim 1, wherein the actuator comprises an electromechanical solenoid.

7. The system of claim 1, wherein the actuator comprises an electric motor.

8. The system of claim 1, wherein the interface structure is configured to transiently interface with the back of the health training mannequin.

9. The system of claim 6, wherein the oscillatory motion inducer is configured to provide loads to the health training mannequin sufficient to cause the mannequin to substantially follow motion of the interface structure relative to the housing.

10. The system of claim 1, wherein the characteristics of the operation of the electromechanical actuator are selected from the group consisting of an oscillatory action timing variable, an oscillatory inaction timing variable, an oscillatory throw dimension variable, and an oscillatory action load variable.

11. A seizure simulation system, comprising:
    a motion inducer comprising a housing, an interface structure, and an actuator;
    wherein the interface structure is coupled to the actuator, movable relative to the housing, and configured to removably and mechanically interface with a portion of a health training mannequin, from a position external to the health training mannequin, to induce seizure simulation motion in at least one portion of the health training mannequin; and
    wherein the housing is coupled to a health training mannequin pad comprising a resting surface for the health training mannequin such that the housing is substantially embedded within the pad below the resting surface, and the interface structure is positioned to oscillatorily move in and out relative to the resting surface with an oscillatory throw dimension configured to induce movement in the at least one portion of the health training mannequin, the oscillatory throw dimension being adjustable from about 0 centimeters (zero inches) of throw to about 5 centimeters (two inches) of throw.

12. The system of claim 11, further comprising a remote unit operably coupled to the system and operable by a user to control the actuator.

13. The system of claim 11, further comprising a remote control coupled to the system and operable by a user to change characteristics of the operation of the actuator.

14. The system of claim 11, wherein the interface structure comprises a piston.

15. The system of claim 14, wherein the piston comprises a substantially cylindrical interface surface configured to interface with the portion of a health training mannequin.

16. The system of claim 11, wherein the actuator comprises an electromechanical solenoid.

17. The system of claim 11, wherein the actuator comprises an electric motor.

18. The system of claim 11, wherein the interface structure is configured to transiently interface with the back of the health training mannequin.

19. The system of claim 16, wherein the oscillatory motion inducer is configured to provide loads to the health training mannequin sufficient to cause the mannequin to substantially follow motion of the interface structure relative to the housing.

20. The system of claim 11, wherein the characteristics of the operation of the electromechanical actuator are selected from the group consisting of an oscillatory action timing variable, an oscillatory inaction timing variable, an oscillatory throw dimension variable, and an oscillatory action load variable.

* * * * *